US012477091B2

(12) United States Patent
Chupeau et al.

(10) Patent No.: US 12,477,091 B2
(45) Date of Patent: Nov. 18, 2025

(54) DEPTH-COLOR ALIGNMENT WITH ASSISTANCE METADATA FOR TRANSCODING OF VOLUMETRIC VIDEO

(71) Applicant: InterDigital CE Patent Holdings, SAS, Paris (FR)

(72) Inventors: Bertrand Chupeau, Rennes (FR); Franck Thudor, Rennes (FR); Remy Gendrot, Montgermont (FR); Gerard Briand, Ploufragan (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 18/853,293

(22) PCT Filed: Mar. 23, 2023

(86) PCT No.: PCT/EP2023/057406
§ 371 (c)(1),
(2) Date: Oct. 1, 2024

(87) PCT Pub. No.: WO2023/194109
PCT Pub. Date: Oct. 12, 2023

(65) Prior Publication Data
US 2025/0254282 A1  Aug. 7, 2025

(30) Foreign Application Priority Data
Apr. 5, 2022  (EP) ..................................... 22305454

(51) Int. Cl.
*H04N 13/161* (2018.01)
*G06T 3/18* (2024.01)
(Continued)

(52) U.S. Cl.
CPC ............ *H04N 13/161* (2018.05); *G06T 3/18* (2024.01); *H04N 13/111* (2018.05); *H04N 19/597* (2014.11)

(58) Field of Classification Search
CPC .. H04N 13/161; H04N 19/597; H04N 13/111; G06T 3/18
(Continued)

(56) References Cited

U.S. PATENT DOCUMENTS

| 9,462,251 | B2 * | 10/2016 | Tu .............................. G06T 3/14 |
| 9,736,454 | B2 * | 8/2017 | Hannuksela .......... H04N 19/597 |
| 11,754,662 | B2 * | 9/2023 | Schwartz ............... H04H 60/07 |
| | | | 348/169 |
| 2014/0168362 | A1 * | 6/2014 | Hannuksela ......... H04N 13/161 |
| | | | 348/43 |

FOREIGN PATENT DOCUMENTS

| EP | 2898689 A1 | 7/2015 | |
| WO | WO-2012122364 A1 * | 9/2012 | ........... H04N 19/597 |
| WO | WO-2014107374 A2 * | 7/2014 | ............. H04N 19/70 |

OTHER PUBLICATIONS

Riegler et al., "Free View Synthesis", arxiv.org, Cornell University Library, 201 Olin Library Cornell University Ithaca, NY 14853, Aug. 12, 2020, 17 pages.
(Continued)

*Primary Examiner* — Jamie J Atala
(74) *Attorney, Agent, or Firm* — Klintworth & Rozenblat LLP

(57) ABSTRACT

Methods, device and data stream are provided to encode unaligned multi-view plus depth images associated with assistance metadata for generating depth maps aligned with the unaligned color views. At the encoding stage, for an unaligned color view, the contribution of each depth map is evaluated. A subset of the most contributing depth maps is selected and metadata representative of this subset is encoded in the data stream of the unaligned multi-view plus depth images in association with the unaligned color view.

(Continued)

At the decoding stage, to generate a depth map unaligned with the unaligned color view, only the depth maps referenced in the assistance metadata are warped.

9 Claims, 2 Drawing Sheets

(51) Int. Cl.
   *H04N 13/111* (2018.01)
   *H04N 19/597* (2014.01)
(58) Field of Classification Search
   USPC .......................................................... 348/43
   See application file for complete search history.

(56) References Cited

OTHER PUBLICATIONS

Aflaki et al., "Unpaired Multiview Video plus Depth compression", 2013 18th International Conference on Digital Signal Processing (DSP), IEEE, Jul. 1, 2013, 6 pages.
"Test model 4 for Immersive video", International Organization for Standardization, Coding of Moving Pictures and Audio, ISO/IEC JTC 1/SC 29/WG 11, Document: N19002, Brussels, Belgium, Jan. 2020, 45 pages.

* cited by examiner

DEPTH-COLOR ALIGNMENT WITH ASSISTANCE METADATA FOR TRANSCODING OF VOLUMETRIC VIDEO

CROSS REFERENCE TO RELATED APPLICATIONS

This application is a U.S. National Stage Application under 35 U.S.C. § 371 of International Patent Application No. PCT/EP2023/057406, filed Mar. 23, 2023, which is incorporated herein by reference in its entirety.

This application claims priority to European Application No. 22305454.5, filed Apr. 5, 2022, which is incorporated herein by reference in its entirety.

1. TECHNICAL FIELD

The present principles generally relate to the domain of multi-view plus depth (MVD) content, in particular, the general principles relate to MVD content acquired by unaligned color and depth sensors. The present document is also understood in the context of the encoding and the formatting of metadata associated with encoded MVD content.

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Multi-view-plus-depth (MVD) images are acquired by a set of color and depth sensors located at different points of a 3D scene and oriented toward the 3D scene. A result of such an acquisition is a set of color images and depth maps. Color and depth sensors may be aligned (i.e. depth sensors and color cameras have common focal points) or they can be unaligned. The number of depth sensors may be different than the number of color cameras. As such a set of color images and depth maps represent a big amount of data, it is usual to encode and compress MVD images using methods that decrease the size of data. For example, encoding a MVD image as a pair of patch atlases is a technique allowing to remove redundant information between (color and/or depth) views and to compress the atlases with image or video compression methods. Unaligned MVD images are easier to capture and lighter to encode than aligned MVD images which require highly technical camera rigs and which generate more depth maps.

MVD images are used, for example, to synthesize virtual viewpoints of the scene (a viewpoint that does not correspond to one of the cameras' viewpoints). View synthesis requires depth map warping and color blending operations. An encoded unaligned MVD image may also be converted into an aligned MVD image. This process consists in synthetizing a depth map for each color image, that is processing a warping of every unaligned depth map for each color image. However, each depth map does not contribute to a view synthesis at the same level according to the location of the viewpoints of the sensors and the location of the view to synthetize. There is a lack of a technique encoding assistance metadata associated with encoded MVD images to limit the number of depth map warping operations, in order to decrease the complexity, computational burden and memory footprint of transcoding.

3. SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate a method comprising:
  obtaining a multi-view plus depth image comprising color views and depth views. At least one of the color views is unaligned with a depth view, that is, there is no depth view having the same focal point than the color view;
  for an unaligned color view, determining a subset of the depth views. The depth views of this subset are the ones that contribute to a generation of a new depth view aligned with the unaligned color view; and
  encoding the multi-view plus depth image and metadata representative of the subset of the first depth views in a data stream, the metadata being associated with the unaligned color view.

The present principles also relate to a processing device comprising a memory associated with a processor configured to implement the method above.

The present principles also relate to a method comprising:
  decoding from a data stream, a multi-view plus depth image, the multi-view plus depth image comprising color views and depth views. At least one of the color views is an unaligned color view, that is a color view that does not share its focal point with a depth view. The data stream also comprises metadata representative of subsets of depth views, each subset being associated with a color view;
  for the unaligned color views, generating a depth view aligned with the unaligned color view by warping the depth views of the subset to the unaligned color view.

The present principles also relate to a processing device comprising a memory associated with a processor configured to implement the method above.

The present principles also relate to a data stream carrying data representative of
  a multi-view plus depth image, the multi-view plus depth image comprising color views and depth views, at least an unaligned color view being unaligned with a depth view; and
  metadata representative of subsets of depth views, each subset being associated with an unaligned color view.

4. BRIEF DESCRIPTION OF DRAWINGS

The present disclosure will be better understood, and other specific features and advantages will emerge upon reading the following description, the description making reference to the annexed drawings wherein.

5. DETAILED DESCRIPTION OF EMBODIMENTS

Figure 1:
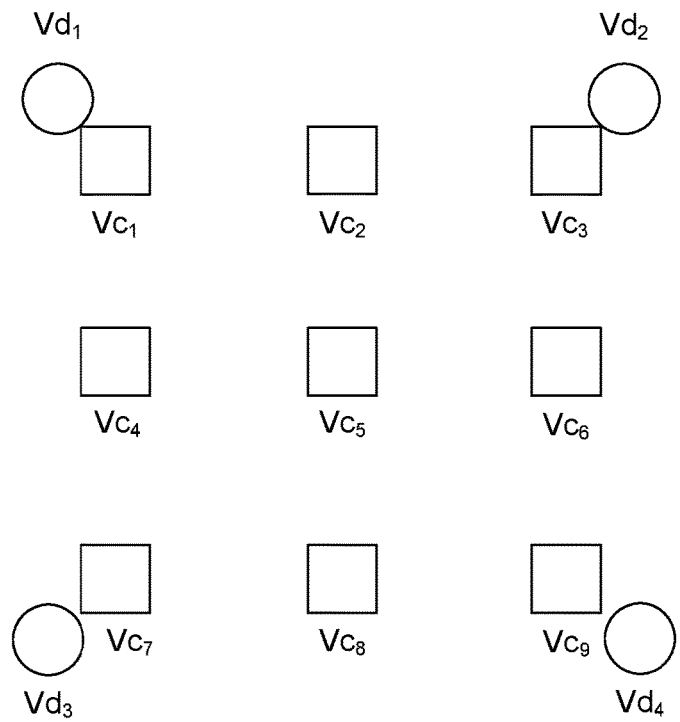
FIG. 1 shows an example camera array layout comprising four depth sensors placed around a three-by-three color camera rig.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

FIG. 1 shows an example camera array layout comprising four depth sensors placed around a three-by-three color camera rig. The present principles are valid for any other arbitrary number and relative positions of color and depth sensors. In the example of FIG. 1, color cameras Vc1 to Vc9 are not aligned with depth sensors Vd1 to Vd4. The number of depth sensors is lower than the number of color cameras. FIG. 1 diagrammatically shows the location and orientation of a set color cameras, each of them capturing a color image, and of a set of depth sensors, each of them capturing a depth map.

Figure 2A:
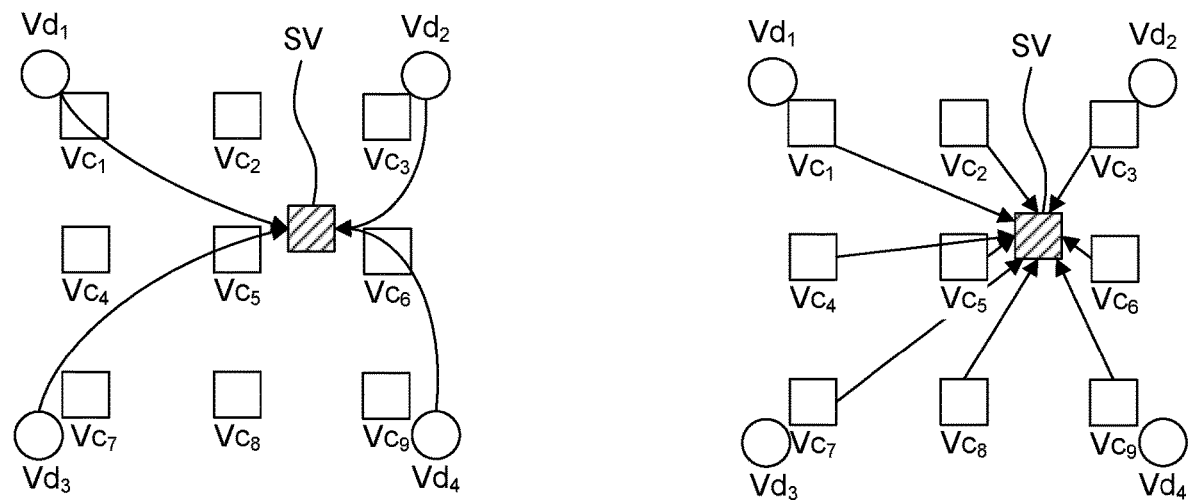
FIG. 2A illustrates the contribution of depth maps and color images captured by sensors of FIG. 1 to a synthetized view.

FIG. 2A illustrates the contribution of depth maps and color images captured by sensors of FIG. 1 to a synthetized view SV. To synthesize a view SV, the renderer de-projects the (u,v) pixels of each decoded depth map to their (x,y,z) 3D position and re-projects the corresponding color attributes of the color images to the corresponding pixel coordinates (u',v') in the virtual viewport frame of reference (that is the pixel array of the view to be synthetized). Such a de-projection plus reprojection process is not straightforward when depth maps (according to related depth sensors) are not aligned with color images (according to related color cameras). Indeed, the color value of a point (x, y, z) (obtained from the de-projection of a pixel of at least one depth map) is not directly available. Existing view rendering algorithms use a two-stage visibility and shading approach. The viewport depth map (also called visibility map) is first generated by warping all of the depth maps to the viewport, selecting the best depth candidate for each pixel and filtering the resulting depth map. Then the color of the viewport is generated by blending the colors of the source views, according to the visibility map. Such a two-stage approach for view rendering does not require that depth and color source views are spatially aligned. However, blending colors on an unaligned visibility map is a process more complex than blending colors on an aligned visibility map.

In some use cases, the MVD source has to be re-generated at the decoder side, and transcoded to a MVD signal with aligned color and depth views. Such transcoding can be required for example to input an autostereoscopic multi-view display. The generation of aligned MVD images may also be required when transcoding, for example a MIV (MPEG Immersive Video) signal to other 3D compression formats that assume spatially aligned color and depth components, such as 3D-HEVC (High Efficiency Video Coding). The generation of depth maps aligned with the decoded color views involve similar depth warping, selecting and filtering operations as in the visibility stage of a rendering algorithm. However, as not a single viewport depth map is to be computed (but the depth maps corresponding to every source color view), the computational demand increases proportionally to the number of color cameras.

Figure 2B:
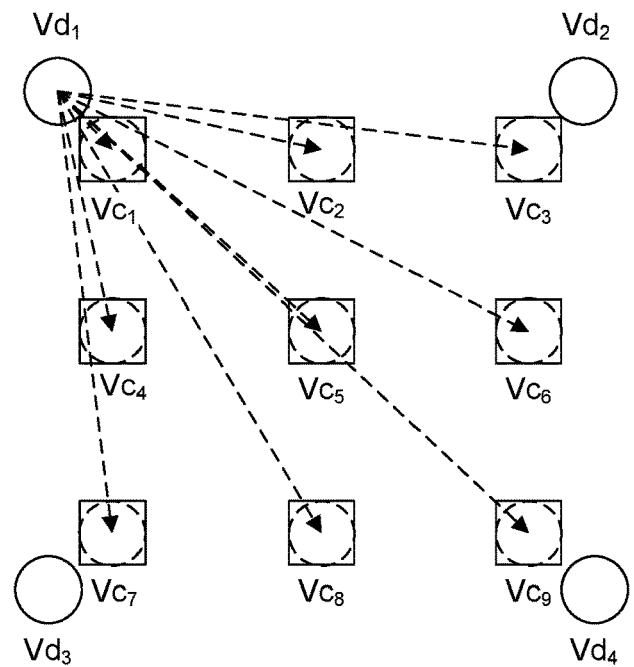
FIG. 2B illustrates the potential contribution of a depth map of FIG. 1, to the depth maps associated with the nine color views.

FIG. 2B illustrates the potential contribution of the depth map from upper left depth sensor Vd1, to the depth maps associated with the nine color views. Upper left depth sensor Vd1 may contribute mostly to the 4 nearby color views (Vc1, Vc2, Vc4, Vc5) rather than to the 5 further ones, and the number of depth warping operations may be reduced to the closest color views. Operations may be more complex according to the 3D geometry of the captured scene and the positions and orientations of the depth sensors.

According to the present principles, an unaligned MVD image is encoded with assistance metadata that provide the decoder with information to limit the number of depth map warping operations, in order to decrease the complexity, computational burden and memory footprint of transcoding. The bigger the number of acquisition cameras (for example, about 30 color cameras around a basketball field when recording a match), the more useful and relevant such assistance metadata for the transcoding process.

The present principles relate to the transmission of a static or a dynamic 3D scene, ingested as a multi-view plus depth (MVD) representation by a volumetric video encoder—for example an MIV encoder—with spatially unaligned color and depth views, originating from non-colocated color and depth sensors.

According to the present principles, the assistance metadata indicate, for each source color view that is not associated with a corresponding aligned depth map, a subset of source depth views that has to be taken into account to generate a depth map aligned with each given color view.

These assistance metadata allow to minimize the computational and buffer memory demand of transcoding at decoder side, by decreasing the number of depth map warping operations (the memory and computational demand is shifted to the encoder side), and to increase the quality of transcoded depth maps, by decreasing the risks of errors when selecting among different depth candidate values, originating from different depth sensors, as a smaller subset of more reliable candidates is provided.

According to the present principles, for each color view, a subset of the source depth views that may contribute to the generation of an aligned depth map is determined. The following method is proposed:

The output of this analysis stage is, for each source color view $Vc_i$, $i \in [1,9]$, the number $N_i$ and the indices $\{Idx_k, k \in \{1, N_i\}\}$ of the depth views $Vd_j$ which depth map may contribute to the depth of $Vc_i$. In the example layout, $N_i$ is in [0, 4] and $Idx_k$ is in [1, 4].

In a first embodiment, the assistance metadata are provided using a modified 3D transmission format. The considered 3D transmission format is MIV, but the present principles apply to any other 3D format able to ingest an MVD input with unaligned color and depth views.

According to the present principles, a data structure like the miv_view_params_list( ) of MIV, which carries global information on the camera parameters, comprises the assistance metadata. Similar to what is done for the camera extrinsic, camera intrinsic and depth quantization parameters, a dynamic temporal update mechanism can also be implemented for the depth warping parameters.

|  | Descriptor |
| --- | --- |
| casps_miv_extension( ) { |  |
|   casme_depth_low_quality_flag | u(1) |
|   casme_depth_quantization_params_present_flag | u(1) |
|   casme_vui_params_present_flag | u(1) |
|   if( casme_vui_params_present_flag ) |  |
|     vui_parameters( ) |  |
|   casme_unaligned_depth_flag | u(1) |
| } |  | casme_unaligned_depth_flag equal to 1 specifies that, in the view parameters list representing a volumetric frame, some views contain geometry but no texture, while some other views, with different camera parameters, contain texture but no geometry. casme_unaligned_depth_equal_flag equal to 0 specifies that, when video geometry data is present, the views which contain texture also contain geometry.

|  | Descriptor |
| --- | --- |
| caf_miv_extension( ) { |  |
|   if( nal_unit_type == NAL_CAF_IDR ) { |  |
|     miv_view_params_list( ) |  |
|   } else { |  |
|     came_update_extrinsics_flag | u(1) |
|     came_update_intrinsics_flag | u(1) |
|     if( casme_depth_quantization_params_present_flag ) |  | for each color view unaligned with a depth view
   initialize to 0, a histogram H[j] of the contributions of source depth views to the target
   view depth map;
   for each source depth view D[j]
      generate a depth map $\tilde{D}[j]$ warped to the color view by;
         - de-projecting / reprojecting pixels towards the target view and
         - splat-based rasterization or triangulation;
   for each pixel (u,v) of the color view:
      select the warped depth map $\tilde{D}[j_{select}]$ which gives the final target depth value
      $\tilde{D}[j_{select}][v][u]$ (e.g. majority voting process taking into account the weight of each
      source depth view with respect to the target view, which depends on their distance),
      and
      increment the corresponding bin of the histogram: $H[j_{select}]$
   discard the source depth views which histogram bin is under a given threshold (or keep
   the n better histogram bins).

| | Descriptor |
|---|---|
| came_update_depth_quantization_flag | u(1) |
| if( casme_unaligned_depth_flag ) | |
|     came_update_depth_warping_flag | u(1) |
| if( came_update_extrinsics_flag ) | |
|     miv_view_params_update_extrinsics( ) | |
| if( came_update_intrinsics_flag ) | |
|     miv_view_params_update_intrinsics( ) | |
| if( came_update_depth_quantization_flag ) | |
|     miv_view_params_update_depth_quantization( ) | |

| | Descriptor |
|---|---|
|   if( came_update_depth_warping_flag ) | |
|     miv_view_params_update_depth_warping( ) | |
| } | |
| } | | came_update_depth_warping_flag equal to 1 indicates that the miv_view_params_update_depth_warping ( ) syntax structure is present in this syntax structure. came_update_depth_warping_flag equal to 0 indicates that the miv_view_params_update_depth_warping( ) syntax structure is not present in this syntax structure. When not present, the value of came_update_depth_warping_flag is inferred to be equal to 0.

| | Descriptor |
|---|---|
| miv_view_params_list( ) { | |
|   mvp_num_views_minus1 | u(16) |
|   mvp_explicit_view_id_flag | u(1) |
|   if( mvp_explicit_view_id_flag ) | |
|     for( v = 0; v <= mvp_num_views_minus1; v++ ) | |
|       mvp_view_id[ v ] | u(16) |
|   for( v = 0; v <= mvp_num_views_minus1; v++ ) { | |
|     camera_extrinsics( v ) | |
|     mvp_inpaint_flag[ v ] | u(1) |
|   } | |
|   mvp_intrinsic_params_equal_flag | u(1) |
|   for( v = 0; v <= mvp_intrinsic_params_equal_flag ? 0 : mvp_num_views_minus1; v++ ) | |
|     camera_intrinsics( v ) | |
|   if( casme_depth_quantization_params_present_flag ) { | |
|     mvp_depth_quantization_params_equal_flag | u(1) |
|     for( v = 0; v <= mvp_depth_quantization_equal_flag ? 0 : mvp_num_views_minus1 ; v++ ) | |
|       depth_quantization( v ) | |
|   } | |
|   mvp_pruning_graph_params_present_flag | u(1) |
|   if ( mvp_pruning graph_params_present_flag ) | |
|     for( v = 0; v <= mvp_num_views_minus1; v++ ) | |
|       pruning_parents( v) | |
|   if( casme_unaligned_depth_flag ) | |
|     mvp_num_texture_only_views_minus1 | u(16) |
|     for( v = 0; v <= mvp_num_texture_only_views_minus1; v++ ) { | |
|       mvp_texture_only_view_idx[ v ] | u(16) |
|       depth_warping( mvp_texture_only_view_idx[ v ] ) | |
| } | | mvp_num_texture_only_views_minus1 plus 1 specifies the number of views which contain texture but not geometry. The value of mvp_num_texture_only_views_minus1 shall be in the range of 0 to mvp_num_views_minus1, inclusive.

mvp_texture_only_view_idx[v] specifies the index, in the list of all views representing the volumetric frame, of the view with index v in the sublist of views which contain texture but not geometry. The value of mvp_texture_only_view_idx[v] shall be in the range of 0 to mvp_num_views_minus1, inclusive.

dw_num_depth_views_minus1[i] plus 1 specifies the number of views containing geometry that may contribute to the geometry of the view with index i. The value of dw_num_depth_views_minus1[v] shall be in the range of 0 to mvp_num_views_minus1, inclusive.

dw_depth_view_idx[i][k] specifies the index, in the list of all views representing the volumetric frame, of the view with index k in the sublist of views which contain geometry and may contribute to the geometry of the view with index i. The value of dw_depth_view_idx[i][k] shall be in the range of 0 to mvp_num_views_minus1, inclusive.

| | Descriptor |
|---|---|
| miv_view_params_update_depth_warping( ) { | |
|   mvpudw_num_view_updates_minus1 | u(16) |
|   for( i = 0; i <= mvpudw_num_view_updates_minus1; i++ ) { | |
|     mvpudw_view_idx[ i ] | u(16) |
|     depth_warping( mvpudw_view_idx[ i ] ) | |
|   } | |
| } | | mvpudw_num_view_updates_minus1 plus 1 specifies the number of depth_warping(i) syntax structures that are present within this syntax structure. The value of mvpudw_num_view_updates_minus1 shall be in the range of 0 to mvp_num_texture_only_views_minus1, inclusive.

mvpudw_view_idx[i] specifies the view index for which updated depth warping parameters will be signalled. The value of mvpudw_view_idx[i] shall be in the range of 0 to mvp_num_views_minus1, inclusive, and shall be equal to one of the values of mvp_texture_only_view_idx[v] for v in the range of 0 to mvp_num_texture_only_views_minus1. It is a requirement of bitstream conformance to this version of this document that the value of mvpudw_view_idx[j] shall not be equal to mvpudw_view_idx[k] for all j!=k.

In a second embodiment, the signalling of depth warping assistance metadata is carried by an optional Supplemental Enhancement Information (SEI) message, with similar syntax and semantics as in the first embodiment. The SEI message can be inserted at any composition time in the bitstream and is valid for the remainder of the sequence, as long as the depth warping information is not refreshed by a new SEI message.

| SEI message | Persistence scope |
|---|---|
| Viewing space | The remainder of the bitstream or until a new viewing space SEI message |
| Viewing space handling | The remainder of the bitstream or until a new view space handling SEI message |
| Geometry upscaling parameters | The remainder of the bitstream or until a new geometry upscaling parameters SEI message |
| Atlas view enabled | Specified by the semantics of the SEI message. |
| OMAF v1 compatible | The remainder of the sequence |
| Geometry assistance | The coded atlas access unit containing the SEI message |
| Depth warping assistance | The remainder of the sequence |

| | Descriptor |
|---|---|
| depth_warping_assistance( payloadSize ) { | |
|   dwa_num_texture_only_views_minus1 | u(16) |
|   for( v = 0; v <= dwa_num_texture_only_views_minus1; v++ ) { | |
|     dwa_texture_only_view_idx[ v ] | u(16) |
|     dwa_num_depth_views_minus1[ v ] | |
|     for(i = 0; i <= dwa_num_depth_views_minus1[ v ]; i++ ) | |
|       dwa_depth view_idx[ v ][ i ] | u(16) |
|   } | |
| } | |

At the decoder side, the assistance metadata are used to generate depth views aligned with color views. The output depth maps spatially aligned with the color views are computed using a visibility step of a view rendering algorithm. According to the present principles, this method is fed only with the subset of decoded depth views signalled by the metadata.

for each decoded color view
  retrieve from metadata the view indices j' of the depth maps candidate to warping;
  for each decoded source depth view $\hat{D}[j']$ ;
generate a depth map $\tilde{D}[j']$ warped to the target view by
    - de-projecting / reprojecting pixels towards the target view, and
    - splat-based rasterization or triangulation;
  for each pixel (u,v) of the target view:
    select a single warped depth value $\tilde{D}[j'_{select}][v][u]$ (e.g. majority voting process
    taking into account the weight of each source depth view with respect to the target
    view, which depends on their distance); and
clean out the final warped depth map using a post median filtering to remove outliers.

Figure 3:
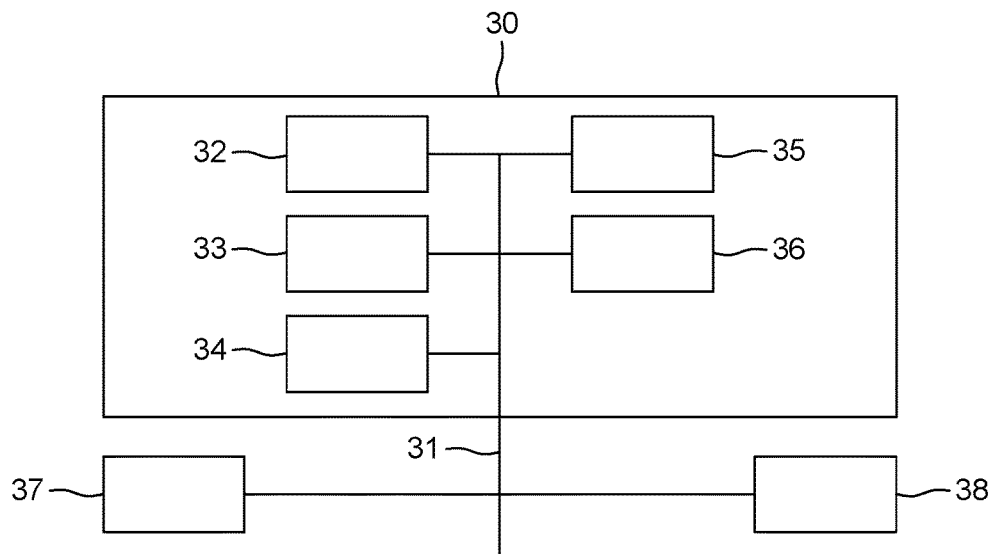
FIG. 3 shows an example architecture of a processing engine which may be configured to implement a method according to the present principles.

FIG. 3 shows an example architecture of a processing engine 30 which may be configured to implement a method described herein. A device according to the architecture of FIG. 3 is linked with other devices via their bus 31 and/or via I/O interface 36.

Device 30 comprises following elements that are linked together by a data and address bus 31:
- a microprocessor 32 (or CPU), which is, for example, a DSP (or Digital Signal Processor);
- a ROM (or Read Only Memory) 33;
- a RAM (or Random Access Memory) 34;
- a storage interface 35;
- an I/O interface 36 for reception of data to transmit, from an application; and
- a power supply (not represented in FIG. 3), e.g. a battery.

In accordance with an example, the power supply is external to the device. In each of mentioned memory, the word register used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Device 30 is linked, for example via bus 31 to a set of sensors 37 and to a set of rendering devices 38. Sensors 37 may be, for example, cameras, microphones, temperature sensors, Inertial Measurement Units, GPS, hygrometry sensors, IR or UV light sensors or wind sensors. Rendering devices 38 may be, for example, displays, speakers, vibrators, heat, fan, etc.

In accordance with examples, the device 30 is configured to implement a method according to the present principles, and belongs to a set comprising:
- a mobile device;
- a communication device;
- a game device;
- a tablet (or tablet computer);
- a laptop;
- a still picture camera;
- a video camera.

Figure 4:
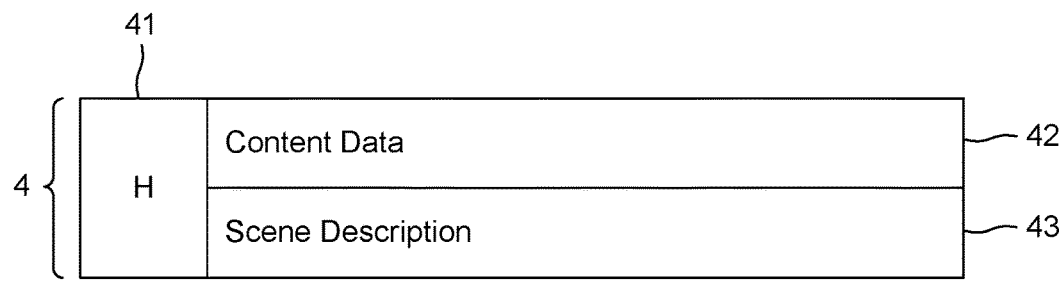
FIG. 4 shows an example of an embodiment of the syntax of a data stream encoding an unaligned MVD image or a sequence of unaligned MVD images according to the present principles.

FIG. 4 shows an example of an embodiment of the syntax of a data stream encoding an unaligned MVD image or a sequence of unaligned MVD images according to the present principles. The structure consists in a container which organizes the stream in independent elements of syntax. The structure may comprise a header part 41 which is a set of data common to every syntax element of the stream. For example, the header part comprises some of metadata about syntax elements, describing the nature and the role of each of them. The structure also comprises a payload comprising an element of syntax 42 and an element of syntax 43. Syntax element 42 comprises data representative of the unaligned MVD images, that is color views and depth maps (also called depth views). Images may have been compressed according to a compression method. Element of syntax 43 is a part of the payload of the data stream and comprises data encoding the assistance metadata as described according to the present principles. An item of the assistance metadata refers to an unaligned color view of a MVD image and comprises a subset of the depth views of the MVD image.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
obtaining a multi-view plus depth image comprising color views and first depth views, wherein at least one of the color views is unaligned with first depth views;
for each unaligned color view, determining a subset of the first depth views by:
for each first depth view, generating a second depth view warped to the unaligned color view;
for each pixel of the unaligned color view, counting a contribution of each second depth view to the new depth view; and
selecting the subset of the first depth views according to the counted contribution of the corresponding second depth views; and
encoding the multi-view plus depth image and metadata representative of the subset of the first depth views for each unaligned color view in a data stream.

2. The method of claim 1, wherein a first depth view is selected if the contribution of the corresponding second view is greater than a given contribution value.

3. The method of claim 1, wherein a subset of the first depth views is determined for each unaligned color view of the multi-view plus depth image.

4. A device comprising a memory associated with a processor configured for:
obtaining a multi-view plus depth image comprising color views and first depth views, wherein at least one of the color views is unaligned with a first depth view;
for each unaligned color view, determining a subset of the first depth views by:
for each first depth view, generating a second depth view warped to the unaligned color view;
for each pixel of the unaligned color view, counting a contribution of each second depth view to the new depth view; and
selecting the subset of the first depth views according to the counted contribution of the corresponding second depth views; and
encoding the multi-view plus depth image and metadata representative of the subset of the first depth views in a data stream.

5. The device of claim 3, wherein a first depth view is selected if the contribution of the corresponding second view is greater than a given contribution value.

6. The device of claim 4, wherein a subset of the first depth views is determined for each unaligned color view of the multi-view plus depth image.

7. A method comprising:
decoding from a data stream, a multi-view plus depth image, the multi-view plus depth image comprising color views and depth views, wherein at least one of the color views is unaligned with depth views and decoding metadata representative of subsets of depth views, each subset being associated with an unaligned color view; and
for each unaligned color view, generating a depth view aligned with the unaligned color view by warping the depth views of the subset to the unaligned color view.

8. A device comprising a memory associated with a processor configured for:
decoding from a data stream, a multi-view plus depth image, the multi-view plus depth image comprising color views and depth views, wherein at least one of the color views is unaligned with a depth view and decoding metadata representative of subsets of depth views, each subset being associated with an unaligned color view; and
for each unaligned color view, generating a depth view aligned with the unaligned color view by warping the depth views of the subset to the unaligned color view.

9. A non-transitory processor-readable storage medium carrying data representative of:
a multi-view plus depth image, the multi-view plus depth image comprising color views and depth views, wherein at least one of the color views is unaligned with a depth view; and
metadata representative of subsets of depth views, each subset being associated with an unaligned color view.

* * * * *